United States Patent [19]
Glasow

[11] 3,925,669

[45] Dec. 9, 1975

[54] STRIPLINE RADIATION DETECTION APPARATUS

[75] Inventor: Peter Glasow, Bubenreuth, Germany

[73] Assignee: Siemens Aktiengesellschaft, Munich, Germany

[22] Filed: July 18, 1973

[21] Appl. No.: 380,470

[30] Foreign Application Priority Data
Aug. 14, 1972  Germany.............................. 2239953

[52] U.S. Cl.................................. 250/370; 250/371
[51] Int. Cl................................................. G01t 1/24
[58] Field of Search............................ 250/370, 371

[56] References Cited
UNITED STATES PATENTS

| | | |
|---|---|---|
| 3,529,159 | 9/1970 | Hornstra et al...................... 250/370 |
| 3,581,091 | 5/1971 | Meijer................... 250/370 |
| 3,624,399 | 11/1971 | Boer et al. .......................... 250/370 |
| 3,812,361 | 5/1974 | Prag et al............................. 250/370 |

*Primary Examiner*—Archie R. Borchelt
*Attorney, Agent, or Firm*—Kenyon & Kenyon Reilly Carr & Chapin

[57] ABSTRACT

A sheet of semiconductor material on the opposite planar sides of which a plurality of spaced apart, parallel stripline electrodes are disposed. The electrodes are offset with respect to each other by a predetermined angle, and the resistance of the semiconductor material and the potential applied to the electrodes are selected so that the depth of the field zone created is equal approximately to the distance between the oppositely disposed electrodes at their crosswise points of intersection. The electrodes on the upper side of the sheet are spaced apart by a distance equal to at least twice the combined thickness of the sheet of semiconductor material and the electrodes.

10 Claims, 1 Drawing Figure

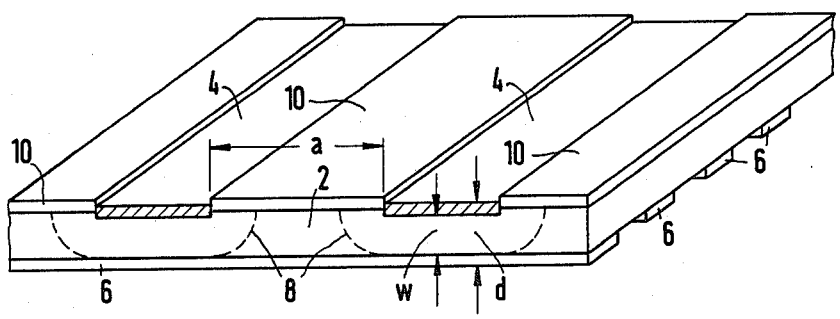

STRIPLINE RADIATION DETECTION APPARATUS

BACKGROUND OF THE INVENTION

1. Field of the Invention

The invention relates to an apparatus for measuring the magnitude, and determining the location, of an ionizing radiation, and in particular to a stripline apparatus having a plurality of parallel, spaced apart electrodes disposed on both sides of a planar sheet of semiconductor material for detecting ionizing radiation.

2. Description of the Prior Art

Stripline radiation detection devices are known in the prior art. See, for example, Swiss Pat. No. 460,962. Generally speaking, the electrodes of such devices are disposed on each side of a sheet of semiconductor material parallel to each other, and have boundary surface layers disposed in front of the electrodes disposed on the upper side of the sheet which are constructed of a vapor deposited layer of gold and form a Schottky-type transition or junction in conjunction with the sheet of semiconductor material. The electrodes disposed on the lower side of the sheet are also parallel to each other, and are offset, at a predetermined angle, generally a right angle, with respect to the electrodes on the upper side of the sheet. The lower side electrodes are generally vapor deposited aluminum layers. The crosswise points of intersection of the upper and lower electrodes form individual detectors for detecting radiated ionizing radiation, and the device is thus suitable for the detection of charged particles, gamma-rays, x-rays and light rays having an energy greater than approximately 1.1 eV.

The utilization of radiation locating and detecting devices for rendering gamma-rays visible has been suggested. A device for this type resembles an Anger system in which the photo-multipliers thereof are replaced by the planar points of crosswise intersection of the stripline electrodes, which, as previously noted, individually function as radiation detectors. Instead of utilizing a floroscopic screen for displaying an output, this device utilizes a semiconductor sheet detector as the image amplifier which generates electrical signals in response to bombardment by electrons. The electrical signals generated are utilized to determine the center of the group of electrons, and further enable the number of electrons to be recorded. Gamma quanta, which produce light distribution effects in the image amplifier input (which may be curved monocrystal or a similar suitable detector), can thus be located and the magnitude of the energy thereof determined. The plurality of strip-line electrodes enable the location of the incidence of the gamma quanta to be determined, and the adjacent electrode strips generate supplementary analogous compensation impluse signals.

Such detection devices which are utilized to determine the center of gravity of the electron distribution of an image amplifier must be sufficiently durable to operate at temperatures of 300°C and above without failure. Detection devices which utilize stripline electrodes formed by vapor deposition methods are, however, generally fabricated with components constructed of synthetic substances, especially Araldit layered material, which burn at temperatures above 150°C. Furthermore, barrier layer electrodes formed of vapor deposited gold are not suitable for operation at elevated temperatures, since high temperatures cause diffusion of the metal into the semiconductor material and destroy the metal-semiconductor junction which acts as the barrier layer. Moreover, the recorders used to record the number of electrons can overrespond.

SUMMARY OF THE INVENTION

It is therefore an object of the invention to provide an improved stripline radiation detection apparatus for measuring the magnitude, and determining the location, of ionizing radiation, which overcomes the above-mentioned disadvantages of known detectors.

Accordingly, the invention provides an improved radiation detection apparatus comprising a planar sheet of semiconductor material, and a plurality of first and second stripline electrodes, disposed on opposite planar sides of the sheet. The electrodes are disposed parallel to each other in a spaced-apart arrangement, and are offset with respect to each other by an angle of approximately 90°. The resistance of the sheet of semiconductor material, and the voltage applied to the electrodes, are chosen so that the depth of the resulting field zone therein is approximately equal to the spacing between the oppositely disposed electrodes at their planar crosswise points of intersection. The stripline electrodes on the upper surface of the sheet are spaced apart from each other by a distance which is equal to at least approximately twice that of the combined thickness of the semiconductor material and the electrodes to prevent overlap of adjacent field zones.

When a voltage is applied across the electrodes on both sides of the sheet of semiconductor material, the resulting field zone expands both perpendicular to the sides of the sheet and laterally towards adjacent electrodes on the same side. Thus, even at low voltage levels, the field zones created may overlap adjacent electrodes. Particles meeting in overlapping zones form charge carriers which are conducted towards both electrodes, resulting in the generation of false impulse signals. The radiation detection apparatus of the invention overcomes this disadvantage, and prevents superimposition of the field zones in the semiconductor material between the stripline electrodes.

In the invention, a thin sheet of semiconductor material is preferably chosen as the detection apparatus so that even a relatively small voltage applied across the electrode expands the field zones through the entire sheet of material. Semiconductor material having a specific resistance greater than 5,000 ohms per centimeter, or even 10,000 ohms per centimeter, produces an extremely sensitive detection apparatus which does not overrespond. By further providing a layer of oxidized material on the sheet between the stripline electrodes thereof, overresponse is further inhibited.

BRIEF DESCRIPTION OF THE DRAWING

The drawing illustrates a perspective view, partially in section, of an improved radiation detection apparatus for measuring the magnitude, and detecting the location, of ionizing radiation constructed according to the invention, and will be described in detail in the following detailed description.

DETAILED DESCRIPTION

Referring now to the drawing, there is shown a sheet of semiconductor material 2 on the opposite sides of which a plurality of parallel stripline electrodes 4 and 6 are disposed in a spaced-apart arrangement. Rectifying electrodes 4, which are disposed on the upper side of sheet 2, are offset from ohmic electrode 6, which are disposed on the lower side thereof, by a predetermined angle, preferably approximately 90°. The spacing $a$ between electrodes 4 on sheet 2 is at least equal to, and preferably greater than, twice the combined thickness $d$ of the sheet of semiconductor material and electrodes 4 and 6. The preferred ratio of the spacing of the electrodes 4 to the thickness $d$ is at least 5:1, and under certain circumstances, the ratio is preferably 10:1 or more. Since the thickness of the electrodes is generally no greater than a few Angstroms, the thickness $d$ is not substantially greater than the spacing $w$ between the electrodes 4 and 6 at their planar crosswise points of intersection. An exemplary semiconductor material which may be utilized as sheet 2 in n-conductive silicon. Alternatively, germanium may also be used.

The voltage applied to electrodes 4 and 6, and the resistance of the semiconductor material comprising sheet 2 (which is determined by choosing the length of the sheet), are selected so that the depth $w$ of the field zone created, whose limit is shown by the dotted lines 8 in the drawing, is at least approximately equal to the distance between electrodes 4 and 6 at their planar crosswise points of intersection. The field zone associated with each of the electrodes 4 is thus prevented from overlapping the field zones of adjacent electrodes, and particles at the edge of the electrodes cannot overlap and travel into the field zone of an adjacent electrode.

A particular advantage of the apparatus of the invention is that practically any method of fabricating electrodes 4 may be utilized. Since the rectifying junction in front of electrode 4 may comprise both a separate boundary layer and a barrier layer, the electrodes may be constructed by vapor deposition of a suitable metal on the sheet of material, by diffusion of a doped material thereinto, or by ion implantation in the semiconductor material.

An oxidized layer of material 10 may be disposed on the surface of sheet 2 by oxidizing the semiconductor material by means of a jet of water vapor directed over the surface of the sheet. Suitable oxidation treatment mediums are potassium bichromate ($K_2Cr_2O_7$) or, alternatively, sodium bichromate ($Na_2Cr_2O_7$). Alternatively, the oxide layer may be produced by directing moist nitrogen gas over the surface of sheet 2 and diffusing the nitrogen into the semiconductor material.

In another embodiment of the invention, the electrodes may also be coated with a thin, electrically insulating layer of oxidized material. This oxidized layer should be as uniform in thickness as possible, and it is therefore preferably produced by a vapor deposition method. The oxidized layer on the electrodes must be sufficiently thick to absorb electrons incident thereon, and prevent their passing through the layer, even at elevated temperatures. For measuring electrons having an energy of, for example 20 keVm, the oxidized layer should be approximately 0.1 to 1 micron in thickness, and preferably approximately 0.3 microns thick. The oxidized layers on both the sheet and electrode may comprise silicon dioxide ($SiO_2$).

While there has been disclosed herein what is considered to be a preferred embodiment of the invention, it will be clear to those persons skilled in the art that many changes and modifications may be made thereunto. It is therefore intended in the appended claims to cover all such changes and modifications as fall within the true spirit and scope of the invention.

What is claimed is:

1. An apparatus for detecting ionizing radiation, comprising:
   a planar sheet of semiconductor material; and
   a plurality of stripline electrodes disposed on opposite planar surfaces of said sheet and offset from each other by a predetermined angle, said electrodes on one of said sheet surfaces being spaced apart by a distance which is at least equal to twice the thickness of the sheet of semiconductor material and said electrodes on both of said surfaces in combination, the length of said sheet and said semiconductor material being chosen so as to provide a predetermined electrical resistance which, in response to a selected voltage applied to said electrodes, creates a field zone of a depth equal approximately to the distance between oppositely disposed electrodes at their planar crosswise points of intersection.

2. The apparatus as recited in claim 1, wherein said electrodes comprise metallic material vapor deposited on said semiconductor material.

3. The apparatus as recited in claim 1, wherein said electrodes comprise doped metallic material diffused into said semiconductor material.

4. The apparatus as recited in claim 1, wherein said electrodes comprise metallic material which is ion implanted into said semiconductor material.

5. The apparatus as recited in claim 1, wherein said electrodes are offset with respect to each other on said sides of said sheet by an angle of approximately 90°.

6. The apparatus as recited in claim 1, wherein said ratio of the spacing of the electrode strips on said one side of said sheet to the combined thickness of the sheet and electrodes is at least 5:1.

7. The apparatus as recited in claim 1, wherein the surface of said sheet is coated between said electrodes on said one side thereof with a layer of oxidized material.

8. The apparatus as recited in claim 7, wherein said layer of oxidized material comprises silicon dioxide.

9. The apparatus as recited in claim 1, wherein the surfaces of said electrodes are coated with a layer of oxidized material.

10. The apparatus as recited in claim 9, wherein said layer of oxidized material comprises silicon dioxide.

* * * * *